Patented Mar. 28, 1939

2,152,160

UNITED STATES PATENT OFFICE 2,152,160

AQUEOUS WOOD PRESERVING LIQUID

Desider Steinherz, Great Neck, N. Y.

No Drawing. Application May 11, 1937,
Serial No. 141,930

1 Claim. (Cl. 134—78.6)

This invention relates to the art of wood preserving and has reference more particularly to the use of sodium silicofluoride as a wood preserving means.

Sodium silicofluoride is well known in the art as a valuable preservative and it has already been proposed to protect wood against decay by treating it with hot aqueous solutions of the same. Beside a high fungicidal power and a good action against termites sodium silicofluoride shows the advantage of being difficultly leachable out by moisture, such as atmospheric deposits, soil water or the like, its solubility in water at 20° C. amounting about 0.6% only. On account of this low solubility it is necessary to use, for the impregnation of wood, hot solutions of sodium silicofluoride of higher concentration, for instance 1–2%, from which however, a considerable amount of sodium silicofluoride separates in crystalline form on cooling during storage. This is a disadvantage because the redissolving of sodium silicofluoride requires heating and stirring of the solution for a longer time.

According to the present invention this drawback can be avoided by using the sodium silicofluoride in mixture with zinc chloride which, as I have found, increases the solubility of sodium silicofluoride in water. This effect is surprising, the solubility of salts being as a rule decreased when adding other salts to their solution.

In carrying out the invention for instance, 10 kgms. of sodium silicofluoride and 10 kgms. of zinc chloride are preferably in the heat dissolved in 1000 kgms. of tap water. This solution is stable at ordinary room temperature, for instance at 20° C., and it can be used for treating wood in any suitable way, for instance by saturating wood in a closed vat according to the so-called full cell process. The sodium silicofluoride and zinc chloride may also be mixed in other proportions. Solutions containing 0.8% of sodium silicofluoride and 0.8% of zinc chloride or 1% of sodium silicofluoride and 2% of zinc chloride may, for instance, be used.

The new mixtures according to the present invention are valuable preservatives for wood. They are highly effective against fungi and termites and therefore capable of protecting wood simultaneously from the attack of fungi and termites. They have also the advantage that the fungicidal effect of the mixtures of sodium silicofluoride and zinc chloride considerably exceeds the sum of the effects of sodium silicofluoride and zinc chloride contained in the mixtures.

The sodium silicofluoride and zinc chloride may be dissolved in water together or one after the other. The dissolution may be accelerated by heating. Other substances, such as for instance, 2,4-dinitrophenol or zinc sulphate, which do not disturb the use of sodium silicofluoride and zinc chloride, may be added to the impregnating liquid. The invention is not limited either to the given substances or proportions or measures.

The treatment of the wood with the preservatives according to this invention can be carried out in any suitable manner, for instance, by treating the wood in closed vats under vacuum and pressure or by immersion in open troughs etc.

What I claim is:

An aqueous wood preserving liquid, which contains more than 0.6% sodium silicofluoride and is stable at ordinary room temperature, consisting of sodium silicofluoride and at least about an equal amount of zinc chloride dissolved in water.

DESIDER STEINHERZ.